L. S. WELCH.
MACHINE FOR SAWING FELLOES.

No. 172,286. Patented Jan. 18, 1876.

Witnesses.
E. H. Latimer.
W. J. Pratt.

Inventor.
Lyman S. Welch
per Crosby Gregory
Att'ys.

UNITED STATES PATENT OFFICE.

LYMAN S. WELCH, OF CANAAN, NEW HAMPSHIRE.

IMPROVEMENT IN MACHINES FOR SAWING FELLIES.

Specification forming part of Letters Patent No. 172,286, dated January 18, 1876; application filed September 11, 1875.

*To all whom it may concern:*

Be it known that I, LYMAN S. WELCH, of Canaan, in the county of Grafton and State of New Hampshire, have invented an Improvement in Machines for Sawing Fellies, of which the following is a specification:

This invention relates to a machine for sawing fellies and employing band-saws under the arrangement hereinafter specified, whereby I am enabled to saw fellies more rapidly than has heretofore been possible, and at the same time saw them evenly.

Figure 1:
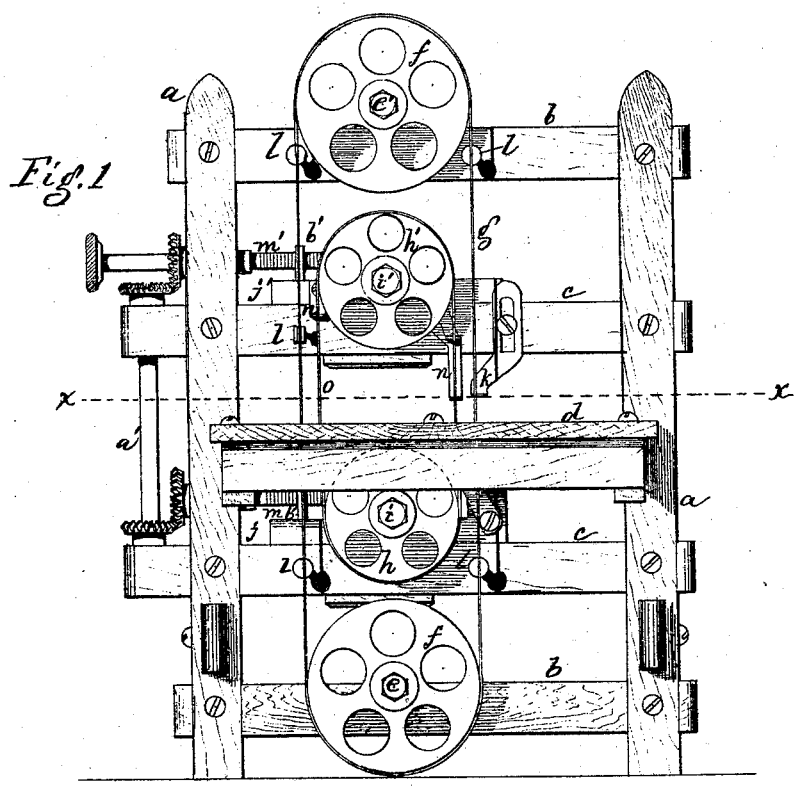
Figure 2:
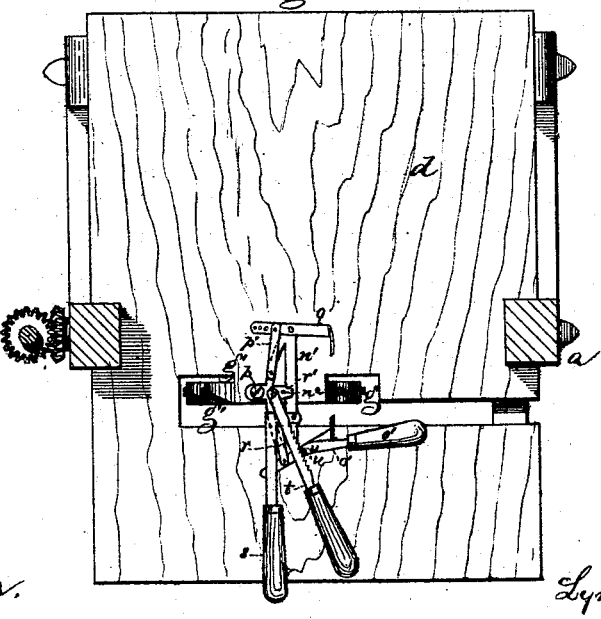

Figure 1 is a front view of a machine embodying my invention. Fig. 2 is a section on the line $x\ x$, Fig. 1, and shows the wood-holding mechanism.

The frame-work $a\ a$ of the machine is connected by suitable cross-bars $b\ b\ c\ c$, and supports a table or surface, $d$, on which the wood to be sawed into fellies rests. In suitable bearings on the cross-bars $b\ b$ I mount shafts $e\ e'$, carrying drums or wheels $f f'$, about the periphery of which, and extending from one drum to the other, is placed the outer band-saw $g$, while the inner band-saw $g'$, arranged within and in the same vertical and horizontal planes with the outer band-saw, is carried by drums $h\ h'$ on shafts $i\ i'$, supported in adjustable bearings $j j'$, resting on the cross-bars $c\ c$. Power is applied to the shaft $e$ in any well-known way, so as to rotate it, and on such shaft, back of the cross-bar $b$, is secured a belt or toothed pulley or wheel, connected by belt with or adapted to engage a pulley or toothed wheel on shaft $i$, back of the cross-bar $c$, and in this way motion is imparted to both the shafts operating the drums or wheels $f\ h$, which move the band-saws. The outer saw $g$ of the pair of band-saws moves in a certain defined path, and is guided by guides $k\ l;$ but the inner saw $g'$ is adjustable to or from the saw $g$, so that the saws $g\ g'$ at the right-hand side of the machine may be separated a distance equal to the width of the felly it is desired to saw. The bearings $j j'$ are together adjustable, so as to keep up the parallelism of the saws by means of screw-shafts $m\ m$, fitted to screw-threaded projections $b'$ on the bearings $j\ j'$, and connected, as herein shown, outside the frame by a shaft, $a'$, through bevel-gears, so that the two bearings move synchronously. The band-saw $g'$ has guides $n$, to guide it, they being carried by the bearings. The wood to be sawed into fellies is held by a pivoted holder provided with jaws attached to arms $o\ o'$, pivoted to a frame, $n^1$, having a projection through which it is adjustably pivoted by a pin or pivot, $p$, to the support $d$. The arm $o$ is connected adjustably by means of a link, $p'$, with the frame $n^1$, and the arm $o'$ is connected by a link, $r$, with a link, $r'$, pivoted to the frame $n^1$ at $n^2$. Connected with the frame, and with link $r$, is a hand-lever, $s$, by means of which the frame, jaws, and wood to be sawed are held between the jaws, and may be turned about the pivot $p$, so as to move the wood in the arc of a circle, the radius of which may be variable, to saw fellies more or less curved, by adjusting the distance between the pivot $p$ and the saws. The arms $o\ o'$ may be opened and closed to hold the wood to be sawed between the jaws, and when properly clamped the notched lever $t$, connected with link $r$, and adapted to engage a pin, $u$, projecting from arm $o'$, and held against such pin by a spring, is caused to engage the pin and hold the jaws firmly pressed into the wood.

It is evident that the outer band-saw might be adjusted instead of the inner one.

I am aware that it is not new to use band-saws placed in different vertical planes and adjustable laterally to increase the distance between the sides of the bands, such saws being adapted for straight sawing; but I am not aware that band-saws have ever before been placed one within the other and made adjustable in the same plane as herein shown; nor am I aware that band-saws have ever been employed or adapted prior to this my invention to saw wood held in a pivoted holder.

I claim—

1. In a felly-sawing machine, the combination of a table with two band-saws, $g\ o$, arranged in the same vertical and horizontal planes, and adjustable laterally in the same plane, and adapted to saw simultaneously the outer and inner portion of a felly-rim.

2. The combination, with the double band-saws, arranged in the same vertical and horizontal planes, of pivoted holding mechanism, substantially as described, to hold and present the material to be sawed into fellies to the band-saws, substantially as set forth.

In testimony whereof I have signed my name to this specification in the presence of two subscribing witnesses.

LYMAN S. WELCH.

Witnesses:
  FRANK CURRIER,
  HENRY CURRIER.